No. 783,309. PATENTED FEB. 21, 1905.
W. H. PRICE.
CALF WEANER.
APPLICATION FILED AUG. 22, 1904.
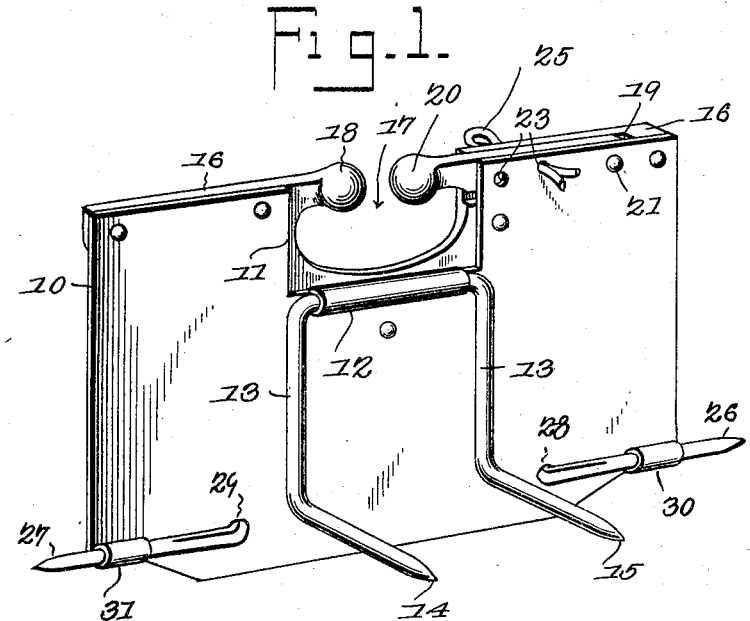
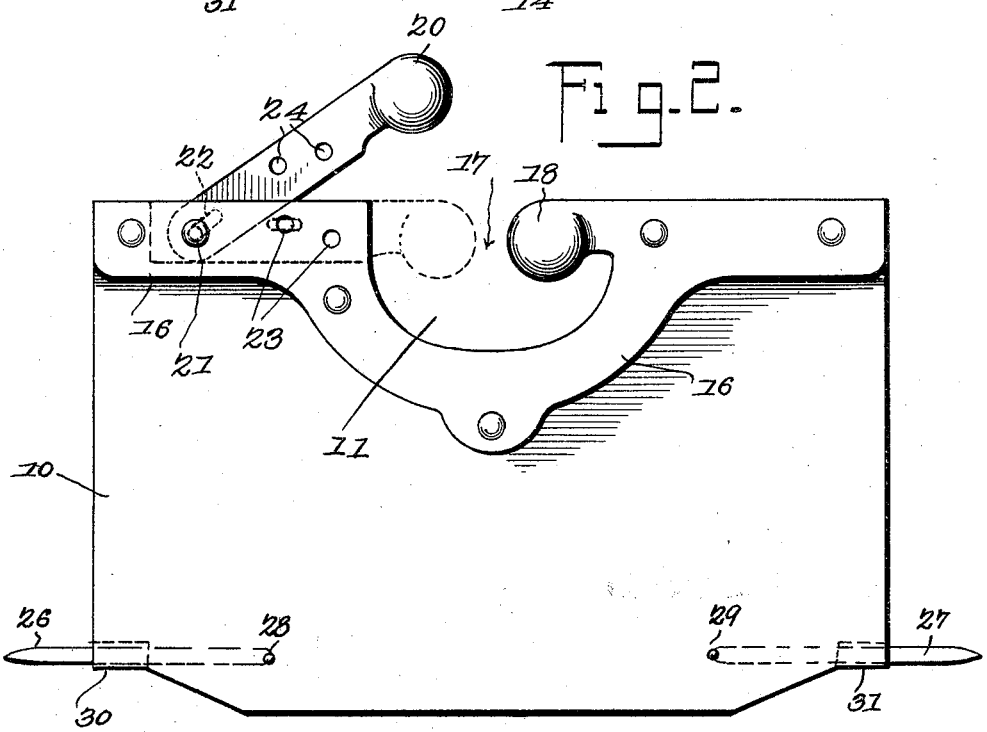
Witnesses
E. T. Stewart
C. N. Woodward
William H. Price, Inventor.
by C. A. Snow & Co.
Attorneys No. 783,309.

Patented February 21, 1905.

UNITED STATES PATENT OFFICE.

WILLIAM HERSCHEL PRICE, OF ELSMORE, KANSAS.

CALF-WEANER.

SPECIFICATION forming part of Letters Patent No. 783,309, dated February 21, 1905.

Application filed August 22, 1904. Serial No. 221,775.

*To all whom it may concern:*

Be it known that I, WILLIAM HERSCHEL PRICE, a citizen of the United States, residing at Elsmore, in the county of Allen and State of Kansas, have invented a new and useful Calf-Weaner, of which the following is a specification.

This invention relates to devices for weaning calves, preventing the self-sucking of cows, and for like purposes, and has for its object to produce a simply-constructed and easily-attached device of this character which will effectually prevent the smaller animal from nursing the mother animal and at the same time cause the mother animal to leave the smaller animal when it attempts to nurse her.

Another object of the invention is to produce a device of this character which may be easily attached to or detached from the animal and adjusted for animals of different sizes.

Another object of the invention is to produce a device adapted for attachment to cows to effectually prevent self-sucking.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings, Figure 1 is a perspective view of the improved device from the front, and Fig. 2 is a rear elevation of the same.

The improved device comprises a plate 10, preferably of sheet metal, having a recess 11 in the upper edge with a portion of the metal formed into a roll or socket 12 to movably support a U-shaped member 13, having the ends turned into laterally-extending spurs 14 15. Attached to the rear upper edge of the plate 10 is a reinforcing member 16, preferably of cast metal, and provided with a central recess 17 opposite the recess 11 of the plate 10 and with nostril-engaging tongue 18, projecting from one side and partially across the recesses. Formed in the member 16 at the opposite side of its recess 17 is a cavity 19, in which a nostril-engaging tongue 20 is pivoted, as at 21, the tongue 20 having a slot 22 where the pivot passes to permit of longitudinal adjustment. Spaced transverse apertures 23 are formed through the plate 10 and member 16, and spaced apertures 24 are likewise formed through the tongue 20 to receive a cotter-pin 25, by which means the movable tongue may be secured in its closed position and adjusted longitudinally to the extent of the slot 22.

The adjacent ends of the tongues 18 and 20 are preferably provided with balls, as shown, to prevent abrasion of the walls of the nostril of the animal when the device is attached.

It will thus be obvious that a simply-constructed and easily-attached device is produced which may be applied to the animal without injury and which, while effectually preventing it from nursing the mother animal, will not prevent grazing or feeding in the ordinary manner of older animals. The swinging spur member 13 while effectually repelling the mother animal will also prod the animal wearing the device by turning upward against its nose if the animal persists in its efforts at nursing the mother animal.

The lower corners of the plate 10 are armed with longitudinally-projecting spurs 26 27 to increase the efficiency of the device, especially when attached to the nostrils of the cow to prevent self-sucking, as any attempt in that direction, as will be obvious, will result in the prodding of the animal and causing her to desist. The longitudinal spurs 26 27 are supported at one end, respectively, by riveting in the plate 10, as at 28 29, and retained in place by clips rolled from the body of the plate, as at 30 31.

Having thus described the invention, what is claimed is—

1. A calf-weaner comprising a plate having laterally-extending spurs at one side and with a recess in one edge, a stationary nostril-engaging tongue projecting from one side of said recess, and a nostril-engaging tongue mounted to swing upon said plate at the opposite side of said recess and in alinement with the longitudinal plane of the plate.

2. A calf-weaner comprising a plate having laterally-extending spurs at one side and with a recess in one edge, a stationary nostril-engaging tongue projecting from one side of said recess, and a nostril-engaging tongue having a slot at one end for movably engaging a pin in said plate at the opposite side of said recess, said movable tongue having spaced apertures for consecutive alinement with corresponding apertures in said plate to receive a detachable holding-pin, whereby the movable tongue may be adjusted longitudinally and locked in closed position.

3. In a calf-weaner, a plate having a recess in one edge with a portion of the material rolled into a socket at the bottom of the recess, a U-shaped member movably engaging said socket and with its terminals extended laterally into spurs, a stationary nostril-engaging tongue projecting from one side of said recess, and a nostril-engaging tongue projecting from the opposite side of said recess.

4. A calf-weaner comprising a plate having laterally-extending spurs at one side and with a recess in one edge, a reinforcing member attached to the recessed edge of said plate and provided with a recess registering with the recess in said plate and provided with a nostril-engaging tongue projecting partially across said recesses, and a nostril-engaging tongue movably connected at the opposite side of said recesses for projection partially over the same.

5. A calf-weaner comprising a plate having laterally-extending spurs at one side and with a recess in one edge, a reinforcing member attached to the recessed edge of said plate and provided with a recess registering with the recess in said plate and provided with a nostril-engaging tongue projecting partially across said recesses, said reinforcing member having a longitudinal cavity at the side of its recess opposite said stationary tongue, and a movable nostril-engaging tongue pivoted in said cavity for swinging across said recesses, and means for locking said movable tongue in closed position.

6. A calf-weaner comprising a plate having laterally-extending spurs at one side and with a recess in one edge, a reinforcing member attached to the recessed edge of said plate and provided with a recess registering with the recess in said plate and provided with a nostril-engaging tongue projecting partially across said recesses, said reinforcing member having a longitudinal cavity at the side of its recess opposite said stationary tongue, a movable nostril-engaging tongue having a slot in one end and pivoted thereby in said cavity whereby it may be adjusted relative to the other tongue, and means for adjustably connecting said movable tongue in said cavity.

7. A calf-weaner comprising a plate having lateral spurs extending from one of its side faces and longitudinal spurs extending from its ends and with a recess in one edge, a stationary nostril-engaging tongue projecting from one side of said recess, and a movable nostril-engaging tongue projecting from the opposite side of said recess.

8. In a calf-weaner, a plate having a recess in one edge with a portion of the material rolled into a socket at the bottom of the recess, a U-shaped member movably engaging said socket, and with its terminals extended laterally into spurs, sockets formed by rolling portions of the lower corners of said plate into tubular form to receive and support longitudinally-extending spurs, and nostril-engaging tongues projecting from opposite sides into said recess and means for adjusting the same.

In testimony that I claim the foregoing as my own I have hereto affixed my signature in the presence of two witnesses.

WILLIAM HERSCHEL PRICE.

Witnesses:
  S. H. BRADEN,
  R. E. COX.